United States Patent

Suzuki

[15] 3,671,758

[45] June 20, 1972

[54] STEERING STRUCTURE CAPABLE OF SIMULTANEOUSLY COMPLETING A HORN CIRCUIT IN A MOTOR-CAR

[72] Inventor: Masaru Suzuki, Hekikai-gun, Japan

[73] Assignee: Kabushiki Kaisha Tokai Rika Denki Seisakusho, Nishikasugai-gun, Aichi-Prefecture, Japan

[22] Filed: Nov. 17, 1970

[21] Appl. No.: 90,357

[30] Foreign Application Priority Data

Nov. 17, 1969 Japan..................................44/108964

[52] U.S. Cl. .............................307/10 R, 200/61.57, 315/81
[51] Int. Cl. ............................................................H01h 9/00
[58] Field of Search...................307/9, 10; 200/61.54, 61.55, 200/61.56, 61.57; 315/81, 80

[56] References Cited

UNITED STATES PATENTS 2,892,359    6/1959    Overman .........................200/61.57 X Primary Examiner—Herman J. Hohauser
Attorney—Woodhams, Blanchard and Flynn

[57] ABSTRACT

A steering structure capable of simultaneously completing a horn circuit in a motor-car which comprises a cam cylinder rotatable with the steering wheel and having a cam with one or more cancelling projections for cancelling the turn signal indicator. A contact pin serves to couple the cam cylinder to the steering wheel for joint rotation therewith and also to electrically connect the lower circuit part in the steering wheel with the horn circuit part in the car body.

2 Claims, 3 Drawing Figures

INVENTOR.
MASARU SUZUKI

INVENTOR.
MASARU SUZUKI

STEERING STRUCTURE CAPABLE OF SIMULTANEOUSLY COMPLETING A HORN CIRCUIT IN A MOTOR-CAR

This invention relates to a steering structure capable of simultaneously completing a horn circuit in a motor-car and more particularly to a structure for connecting one part of a horn circuit provided in a car body to the other part of the horn circuit provided in a steering wheel in such a motor-car so that a warning horn fixed in the car body is actuated by manually operating a horn switch mounted on the steering wheel.

Heretofore, in a car horn structure of the aforementioned type, an electric line connecting means is additionally employed for coupling the two parts of the horn circuit and electric line connecting devices are required in addition to the fundamental assembly of steering elements. The connection of the two parts of the horn circuit can be effected, according to this invention, automatically and simultaneously with the mounting of the steering wheel on a steering shaft.

It is, therefore, an object of the present invention to provide a steering structure capable of simultaneously completing a horn circuit in a motor-car which can assure a reliable connection of two separate parts of the horn circuit respectively provided in a car body and in a steering wheel.

It is another object of the present invention to provide a steering structure capable of simultaneously completing a horn circuit in a motor-car which needs no additional means for assembling the same and, therefore, requires no special labor for connecting both terminals of said two parts of the horn circuit to complete the horn circuit.

Essentially, according to this invention, there is provided a steering structure capable of simultaneously completing a horn circuit in a motor-car, which steering structure comprises a cam cylinder having a cam with one or more cancelling projections and mounted coaxially with a central bore of a direction indicator. A steering shaft is rotatably received in said bore. The cam cylinder rotates with the steering shaft and is mounted for axial sliding movement. The cam cylinder is supported by a spring. A contact pin has a head at its top portion which head is inserted in a recess formed in the steering wheel. The contact pin has a rod at its lower portion, which rod fitted in said cam cylinder and prevents rotation of the cam cylinder with respect to the steering shaft. A terminal plate is attached to the top wall of said recess to abut said contact pin and said plate serves as a terminal of a part of a horn circuit provided in the steering wheel and including a horn switch. A ring is provided coaxial with the steering shaft and slidably between the end of the rod of said contact pin and said spring. The spring rests on the terminal of another part of the horn circuit provided in the car body, thereby completing the horn circuit.

The foregoing and other objects, features and advantages of this invention will be made apparent from the following description taken in connection with the accompanying drawings, in which.

Figure 1:
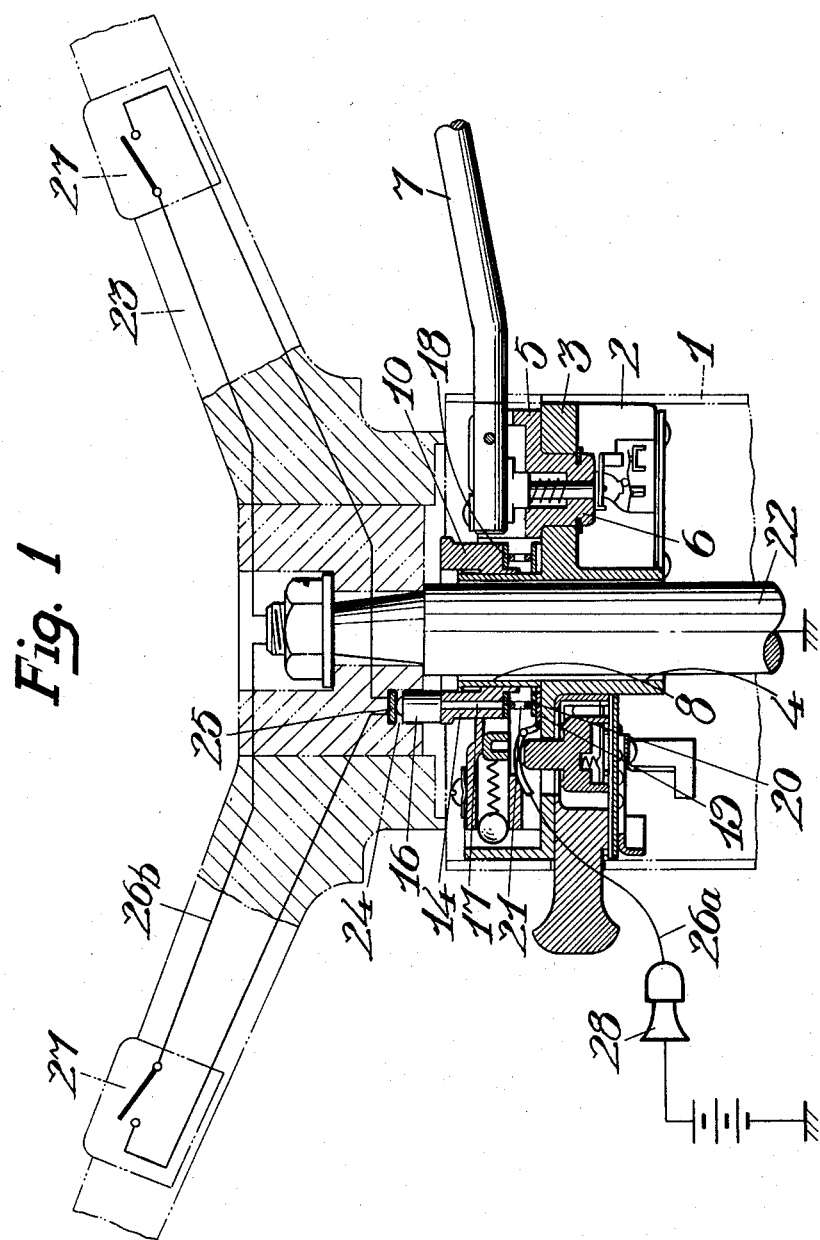
FIG. 1 is a vertical central sectional view of a preferred embodiment of this invention.

Referring now to the drawings, there is illustrated a steering structure capable of simultaneously completing a horn circuit in a motor-car according to this invention.

Numeral 1 designates a steering column surrounding a steering shaft 22 and fixed to a dash board of a motor-car. A direction indicator 2 is fitted to the top portion of the steering column 1. Said direction indicator 2 comprises, as is known in the art, a body member 3 having a central bore 4 for rotatably receiving the steering shaft 22 and a movable bracket 5 having a shaft 6 inserted in said body member 3 and an actuating lever 7 projecting outside the column 1. There is formed a supporting sleeve 8 which is integral with the body member 3 and projects upwardly from the upper edge of the central bore 4. A flange 9 is formed at the top of said supporting sleeve 8.

Figure 3:
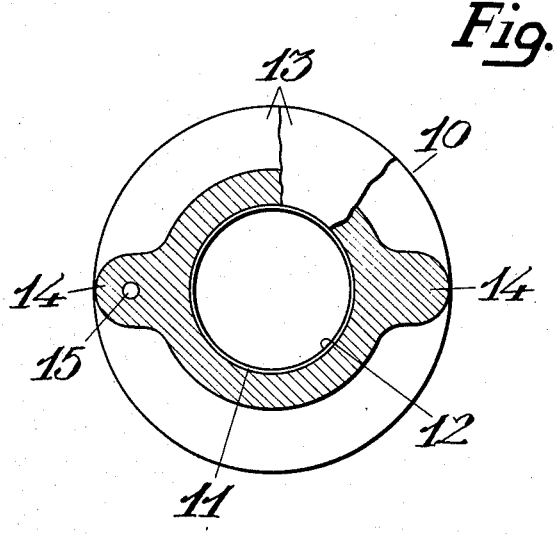
FIG. 3 is an enlarged plan view of a cam cylinder, partly cut away.

Numeral 10 designates a cam cylinder of plastic material fitted onto the supporting sleeve 8 from the top. The cam cylinder 10 slidably contacts the sleeve 8 and is notable with respect thereto conjointly with the steering shaft. Said cam cylinder 10 has on the lower part of its inner peripheral wall a step 12 engageable with aforesaid flange 9 of the supporting sleeve 8 in a clearance 11 as depicted in FIG. 3. The cam cylinder 10 also has also flanges 13, 13 respectively formed on the outer surface around the top and the bottom portions thereof. Numerals 14, 14 indicate cancelling projections of a cam provided on the cam cylinder 10 between its upper and lower flanges 13, 13. The cam cylinder 10 is fitted to a steering wheel 23 so as to correlatively rotate with the steering shaft 22 as described hereinafter and adapted to effect the known operation of a direction indicator. In the known operation, a ratchet (not shown) of the movable bracket 5 effecting direction indication by means of the actuating lever 7 protrudes into the rotary zone of the cancelling projection 14, of the cam 10 which rotates with the steering wheel 23. The ratchet is adapted to engage with said cancelling projection to set back the movable bracket 5 to the neutral position automatically when the steering wheel is returned after completing a turn.

In the cam cylinder 10, there is formed a hole 15 axially extending through one of the cancelling projections 14. In said hole 15, a rod 17 of a contact pin 16, which serves also as a pin for coupling together the cam 10 and the steering wheel 23, is inserted from the top to the bottom. The lower tip of said rod 17 contacts a ring 18 slidably provided on the bottom of the cam cylinder 10. Similarly to the cam cylinder 10, the ring 18 is coaxial with the steering shaft 22. Numeral 19 is a contact ring fixed on the body member 3 below said ring 18 and numeral 20 is another ring slidably mounted on said contact ring 19. Between said two rings 18 and 20, there is provided a spring 21 for supporting the cam cylinder 10.

In FIG. 1, there is illustrated the steering wheel 23 which is adapted to be fitted on the top of the steering shaft 22. In the under portion of the steering wheel 23, having an insulator at its central portion, there is formed a recess 24 for receiving the contact pin 16. In said recess 24, a terminal plate 25 is fitted to the top wall thereof.

Both terminals of one part 26b of a horn circuit located in the steering wheel 23 are connected to said terminal plate 25 and to the steering shaft 22, respectively. The one part 26b of the horn circuit includes a horn switch 27 mounted on the steering wheel 23.

The other part 26a of the horn circuit located in the car body is connected by a lead wire to the contact ring 19.

Figure 2:
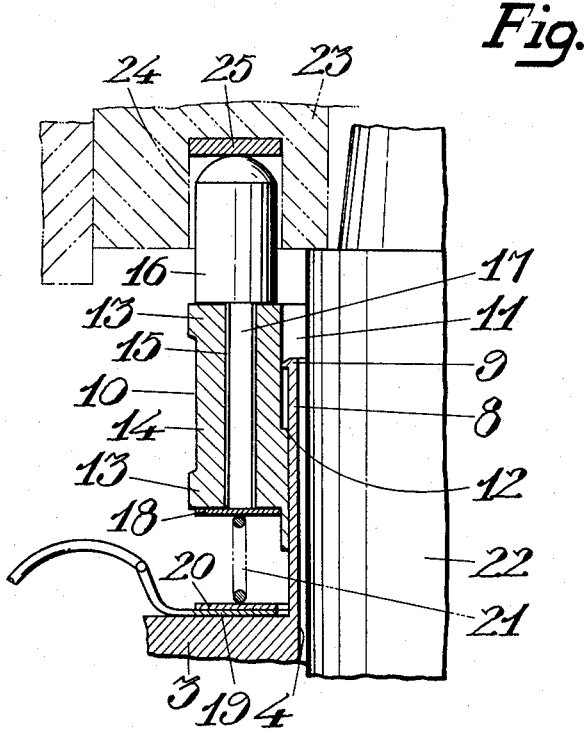
FIG. 2 is an enlarged view of a fragment of FIG. 1 and showing the elements for connecting the two parts of the horn circuit according to this invention.

The assembly operation of the members is described as follows;

The cam cylinder 10 is fitted over the supporting sleeve 8 in such a manner that the flange 9 extends into the clearance 11 and confronts the step 12 as depicted in FIG. 2. The action of the spring 21 raises the cam cylinder 10 until the step 12 abuts the under surface of the flange 9.

The column 1 is fixed around the steering shaft 22 and then the direction indicator 2 is fitted to the column 1 in such a manner that the central bore 4 thereof rotatably receives the shaft 22. Then the steering wheel 23 is fitted on the shaft 22 and it pushes the contact pin 16 to urge the cam cylinder 10 downwardly against the spring 21. The assembly is completed by effecting a positioning of the wheel 23 to fit the contact pin 16 precisely in the recess 24.

With completion of the assembly, the cam cylinder 10 provided with the cancelling projections 14 is connected with the steering wheel 23 so as to rotate therewith. At the same time, the two parts of the horn circuit, 26a in the car body and 26b in the steering wheel, are electrically connected with each other through the contact made between the contact pin 16 and the terminal plate 25 in the hole 24.

When the steering wheel 23 is rotated during driving of the car, the cam cylinder 10 connected thereto through the contact pin 16 rotates synchronously therewith inside the direction indicator 2 and always keeps connection with the one part of the circuit 26a in the car body through the rod 17 of the contact pin 16, the ring 18, the spring 21 and the ring 20 thereby to enable the actuation of the horn 28 to be effected by closing of the horn switch 27.

As is apparent from the foregoing description, according to this invention, there is no need of employing an additional electric connector, as in the conventional horn structure, between the steering wheel and the direction indicator, and electric line connecting devices are completely eliminated. This is so because both parts of the circuit 26a and 26b respectively, in the car body and in the wheel, are connected with each other to complete the horn circuit by inserting the contact pin 16 which pin serves both to compel joint rotation of the steering wheel 23 and the cam 10 and as a terminal of said one part of the circuit 26a in the car body into the hole 24 having the terminal plate 25 which serves as a terminal of the other part of the circuit 26b in the steering wheel.

Moreover, it is noted that the electric connection through the ring 18 is always surely maintained regardless of rotation of the steering structure. It is to be noted that said ring 18 is an element which is usually employed as a washer in the conventional steering structure but, in this invention, it serves also as an electric connecting element. Therefore, in assembling the present structure, very few additional electric connecting elements are required for completing the horn circuit, and the assembling processes are reduced as compared with the conventional horn structure.

What is claimed is:

1. A steering structure in a motor-car, which comprises: a steering wheel mounted on a steering shaft; a direction indicator mechanism having a central bore through which said steering shaft extends; a cam cylinder having a cam with one or more cancelling projections and mounted coaxially with said central bore of said direction indicator mechanism, said cam cylinder being mounted for conjoint rotation with said steering shaft and for axial sliding movement with respect to said steering shaft; a spring for supporting said cam cylinder; a contact pin provided at its top portion with a head inserted in a recess formed in said steering wheel and provided at its lower portion with a rod fitted in said cam cylinder and serving for preventing relative rotation between said steering wheel and said cam cylinder; a terminal plate at the top wall of said recess and abutting said contact pin, said terminal plate being a terminal of a first part of a horn circuit provided in the steering wheel, said first part of said horn circuit including a horn switch; a ring coaxial with the steering shaft and slidably contacting the end of the rod of said contact pin and said spring, said spring being in electrical contact with the terminal of a second part of the horn circuit provided in the car body, thereby completing the horn circuit.

2. A steering structure according to claim 1, in which said spring rests on a second ring, which second ring in turn slidably rests on a third ring, said third ring being said terminal of said second part of the horn circuit.

* * * * *